Aug. 10, 1965        J. F. STROUD ETAL        3,199,810
                     SUPERSONIC DIFFUSER

Filed Aug. 29, 1963                        3 Sheets-Sheet 1

INVENTORS.
JOHN F. STROUD
DANIEL M. COLEMAN
BY
George C. Sullivan
        Agent

Aug. 10, 1965

J. F. STROUD ETAL 3,199,810

SUPERSONIC DIFFUSER

Filed Aug. 29, 1963

INVENTORS.
JOHN F. STROUD
DANIEL M. COLEMAN
BY
*George A. Sullivan*
Agent

INVENTORS.
JOHN F. STROUD
DANIEL M. COLEMAN
BY

*George C. Sullivan*
Agent

United States Patent Office 3,199,810
Patented Aug. 10, 1965

3,199,810
SUPERSONIC DIFFUSER
John F. Stroud, Northridge, and Daniel M. Coleman, Los Angeles, Calif., assignors to Lockheed Aircraft Corporation, Burbank, Calif.
Filed Aug. 29, 1963, Ser. No. 305,553
9 Claims. (Cl. 244—53)

This invention relates to a supersonic diffuser, and more particular to an aircraft supersonic diffuser which is of the external compression type and which has a low-drag cowl.

The transition from supersonic to subsonic flow of air to an air-breathing aircraft engine occurs through a shock-wave at right angles to the flow direction. This shock is known as a normal shock. To minimize losses, the inlet to the engine is designed to impart a gradual deceleration to the flow by means of a system of one or more weak, oblique shock waves ahead of the normal shock. Such an inlet is known as a "supersonic diffuser."

Supersonic diffusers are conventionally of three basic types. One type is the external-compression inlet type wherein the supersonic diffusion takes place at or ahead of the cowl lip. Such inlets generally employ one or more oblique shock waves ahead of the normal shock. The number of oblique shocks increases the pressure recovery. When increased compression is required for increased speeds of the aircraft, there is an increase in the flow turning angle required which, according to prior art teachings, should be reflected in an increasingly steeper cowl angle, i.e., the angle formed between the inner surface of the lip of the cowl and the centerline of the cowl inlet. Hence, in prior art aircraft, cowl angle was increased for increased speeds because it was considered necessary to have the airflow approach the cowl from a direction in alignment with the lip. It was further believed in prior art aircraft that the flow must be turned gradually at the inlet entrance which resulted in large cowl frontal areas with high cowl angles. This resulted in excessive aerodynamic drag by the cowl, or cowl drag.

A second type is a combination external and internal compression inlet wherein oblique shock waves occur both upstream and downstream of the cowl lip with the normal shock wave occurring downstream of the inlet throat (minimum area section). This type of inlet requires a highly complex control system in order to maintain the normal shock inside the cowl. In using this inlet, compromises must be made in performance to achieve a reasonable degree of inlet and engine flow stability. Even then, this stability is not completely reliable because small disturbances in either the external or internal air flow passing through the inlet may cause the normal shock wave to move forward ahead of the cowl lip, this phenomenon being known as "inlet unstarting." This action is potentially destructive in that an overpowering yawing moment may result if one of the engines disgorges its shock in such a manner without immediate recovery.

A third type is an internal-compression inlet which accomplishes supersonic diffusion internally or downstream of the cowl lip. A number of weak, reflecting waves in a gradually convergent channel inside the cowl produce deceleration of the flow. Small, adverse pressure gradients on the boundary layer are maintained by keeping the surface angles quite small which results in a rather long supersonic diffuser. Such diffusers are also characterized by the same unstable flow mentioned above in connection with the second type.

Accordingly, it is the primary object of the present invention to provide a supersonic diffuser of the external compression type for aircraft which has a low aerodynamic drag characteristic and at the same time has flow stability characteristics superior to those of the external-internal and the internal compression type inlets.

Another object of the present invention is to provide a supersonic diffuser of the type described which will satisfy the air flow requirements of air-breathing engines over the supersonic, transonic, and subsonic flight speed regimes while achieving high pressure recovery, low cowl drag and maximum flow stability.

A further object of the present invention is to provide a variable configuration for a supersonic diffuser of the external-compression type.

According to the present invention, a low-drag, external-compression type supersonic diffuser is provider for an aircraft engine. The diffuser utilizes a variable geometry cone or spike to create oblique shocks outside the cowl followed by a normal shock slightly ahead of the cowl lip. The cone is designed to change shape in order to facilitate turning the airflow and match engine airflow requirements at all flight speeds. As the shape is modified, an air scoop around the cone is exposed just downstream of the cowl lip. This opened scoop bleeds off the boundary layer in order to obtain high inlet performance (pressure recovery). A low-drag cowling surrounds the cone and bleed scoop. Its low-drag characteristics are achieved by providing the cowling with a thin, sharp lip having a small inward angle.

The features of the present invention which are believed to be novel are set forth with particularity in the appended claims. The present invention, both as to its organization and manner of operation, together with further objects and advantages thereof, may best be understood by reference to the following description taken in connection with the accompanying drawings in which:

Figure 1:
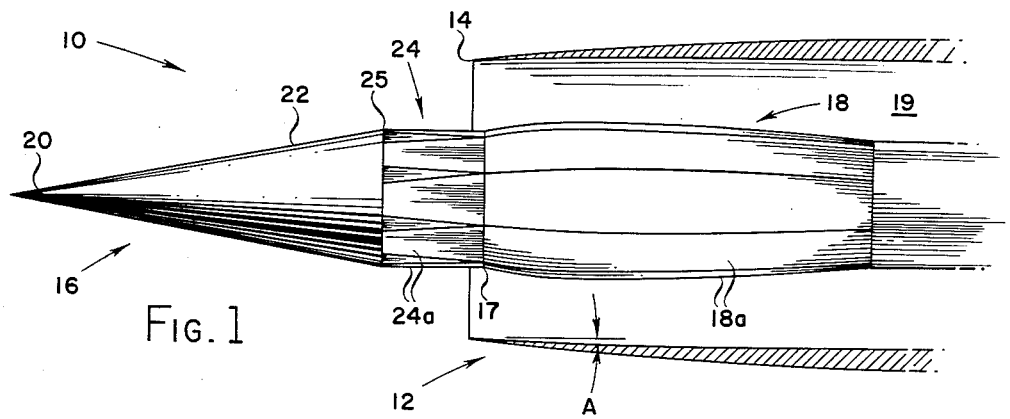
FIGURE 1 is a cross-sectional view, with parts shown in elevation, of a supersonic diffuser of the present invention shown in a first operating position, corresponding to subsonic flight operation.

Referring again to the drawings, a supersonic diffuser of the present invention, generally designated 10, includes a substantially cylindrical, low-angle aircraft cowl 12 having a thin, sharp lip 14 with an inward angle A (FIGURE 1) of approximately 0 to 5 degrees so that the cowl 12 presents a minimum drag. The cowl 12 surrounds a variable geometry cone or spike 16, a bleed scoop 17 (FIGURE 5) and a subsonic diffuser wall 18 forming an air duct 19 with the cowl 12. The diffuser wall 18 may have segments 18a which are similar to standard, aircraft cowl flaps.

The variable geometry cone or spike 16 includes a solid, sharp forward tip 20 which merges into a hollow, primary cone 22 which, in turn, is telescopically linked to, and merges with, a hollow, secondary cone 24. The secondary cone 24 includes segments 24a so that, as the primary cone 22 telescopes into the secondary cone 24, the diameter at the fore edge 25 of the secondary cone 24 diminishes to fit the reduced diameter of the primary cone. The diameter of the aft portion of the secondary cone 24 simultaneously increases as the parts move to the FIGURE 3 position to turn the airflow outward toward the lip 14. The segmental construction of the secondary cone 24 may be like that shown in Patent No. 3,069,842 for the segments 27 wherein channels 27a are provided for the reception of sealing strips 37.

The primary cone 22, the secondary cone 24 and the wall 18 are positioned in FIGURE 1 for subsonic flight wherein the leading edge of the bleed scoop 17 is closed upon the aft edge of the secondary cone 24 and the geometry of cone 16 is such that a maximum flow passage exists in the duct 19.

Figure 2:
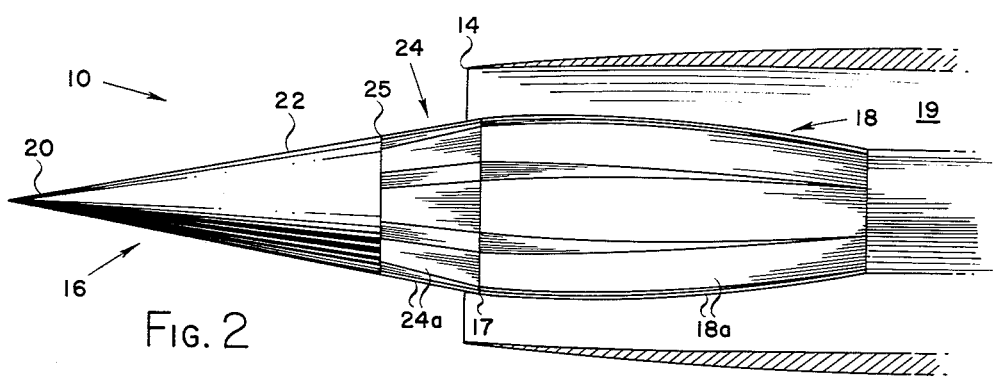
FIGURE 2 is a cross-sectional view similar to FIGURE 1 with the parts shown in a second operating position, corresponding to transonic flight operation.

FIGURE 2 shows the position of the parts at transonic speeds wherein the geometry of cone 16 has begun to change to a double cone configuration as the primary cone 22 retracts into the secondary cone 24.

Figure 3:
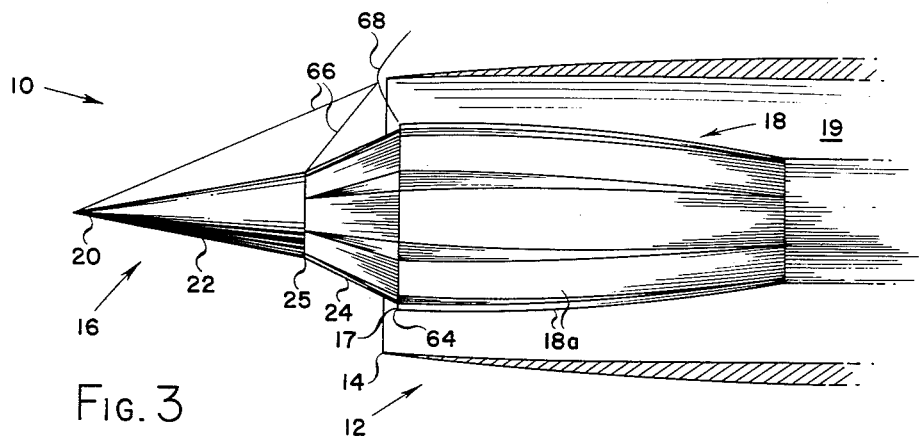
FIGURE 3 is a view similar to FIGURE 1 with the parts shown in a third operating position, corresponding to maximum supersonic speed flight operation.

At a supersonic speed, the parts move to the position shown in FIGURE 3 wherein the geometry of the cone is changed to significantly increase the flow turning angle. At the same time, the bleed scoop 17 exposes a passageway 64 to bleed off the boundary layer that exists due to an adverse pressure gradient behind the shock waves. This boundary layer is bled to improve the pressure recovery at the face of the aircraft engine (not shown). The relative positions of the aft edge of the secondary cone 24 and the lip 14 are such that the normal shock wave 68 is created slightly upstream of lip 14. This also improves the pressure recovery at the aircraft engine face (not shown).

Figure 4:
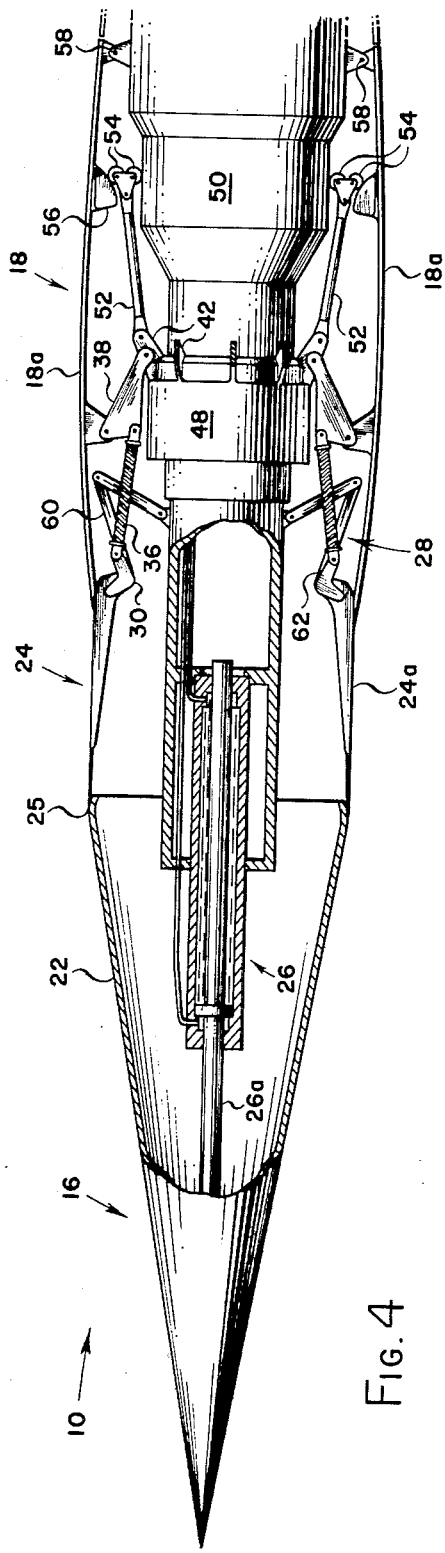
FIGURE 4 is a partial, cross-sectional view of the device of FIGURE 1, on an enlarged scale, with parts broken away to show internal construction.

A hydraulic primary cone actuator 26 (FIGURES 4 and 5) is connected to the primary cone 22 by a piston rod 26a and protracts and retracts the cone 22 relative to the secondary cone 24. A secondary-cone linkage mechanism 28 is connected to the secondary cone 24 to change its shape when the primary cone 22 is protracted and retracted.

The linkage mechanism 28 (FIGURES 4-8) includes a plurality of bell cranks 30. Each bell crank 30 has one arm 31 affixed to a web 32 on each segment 24a by pins 33 and 34. The other arm 35 of each bell crank 30 is pinned to one end of a spring cartridge 36 which biases its associated segment 24a into engagement with the cone 22. The other end of each spring cartridge 36 is pinned to one apex 37 of a triangular member 38 which has a second apex 39 pinned to a segment 18a of the diffuser wall 18 and a third apex 40 pinned to a link 42 intermediate its ends 44 and 46. The ends 44 of links 42 are rigidly affixed to an annular hydraulic cylinder 48 which is reciprocally mounted on a stationary piston 49 forming a portion of an island 50. The end 46 of each link 42 is pinned to one end of a push rod 52 which carries a pair of rollers 54 at its other end. One roller 54 of each pair is adapted to roll along island 50 when cylinder 48 is reciprocated and the other roller 54 of each pair engages a cam 56 on an associated diffuser wall segment 18a to assist member 38 in increasing the diameter of bleed scoop 17 by pivoting segments 18a about their pivot points 58.

A double armed link 60 has one end 62 pinned to an associated segment 24a by its pin 34 and another end 63 pinned to the island 50 to maintain the segments 24a in their proper relationship in all operating positions thereof.

Figure 5:
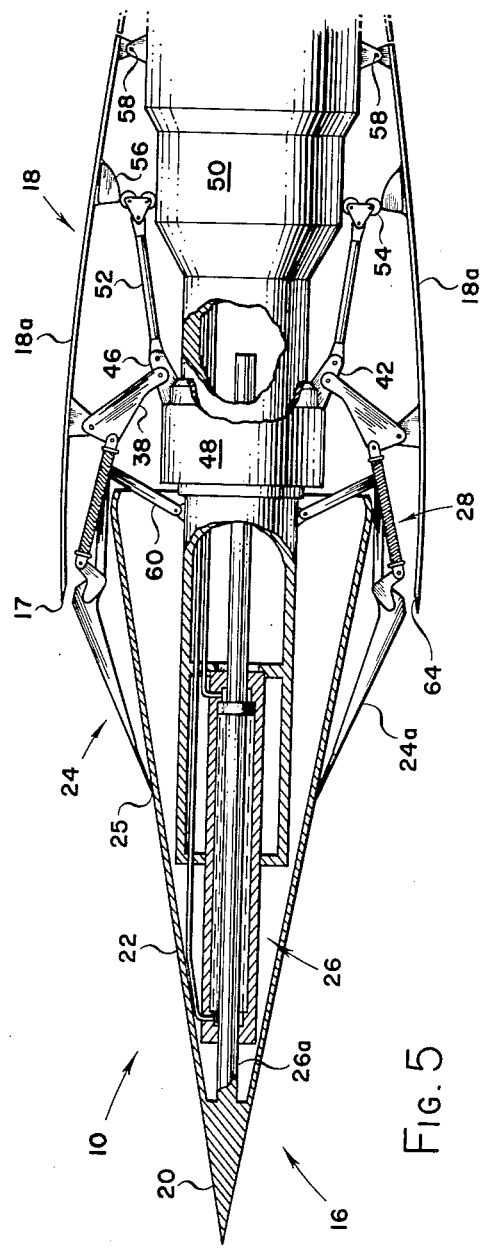
FIGURE 5 is a partial, cross-sectional view of the device of FIGURE 3, on an enlarged scale, with parts broken away to show internal construction.
Figure 6:
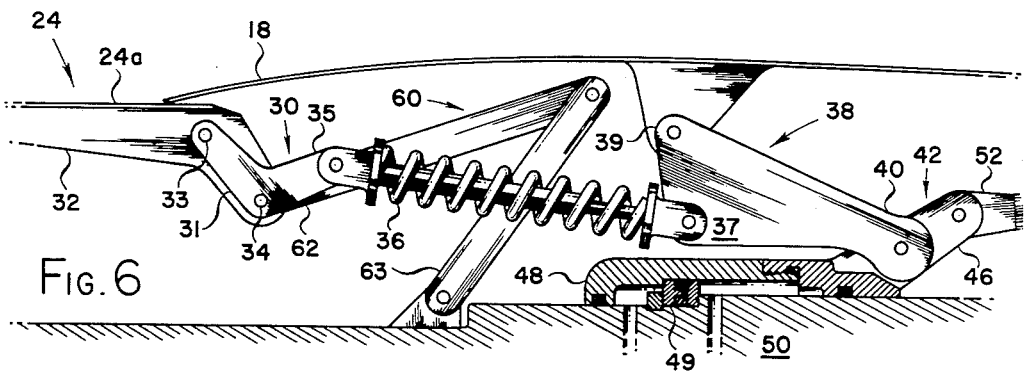
FIGURE 6 is a partial, elevational view, on an enlarged scale, showing the position of internal linkages when the device of the present invention is in its FIGURE 1 position.
Figure 7:
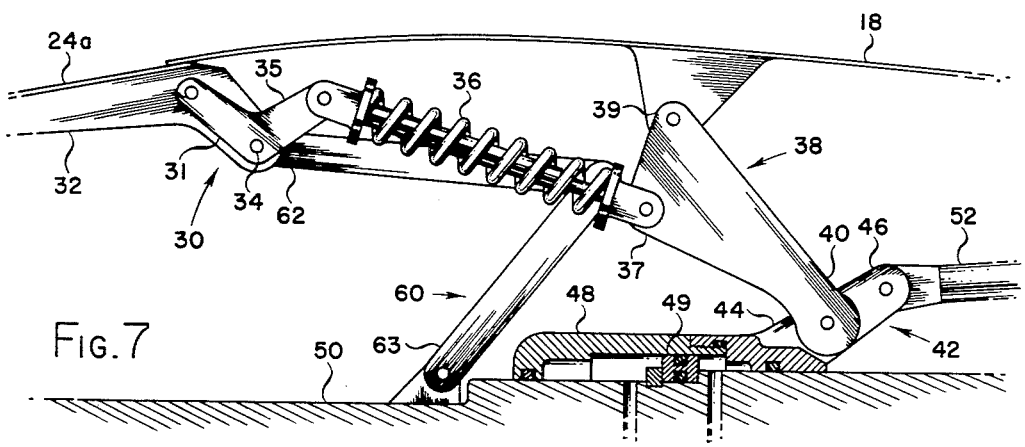
FIGURE 7 is a view similar to FIGURE 6 with the parts thereof shown in the position they assume when the device is in its FIGURE 2 position.
Figure 8:
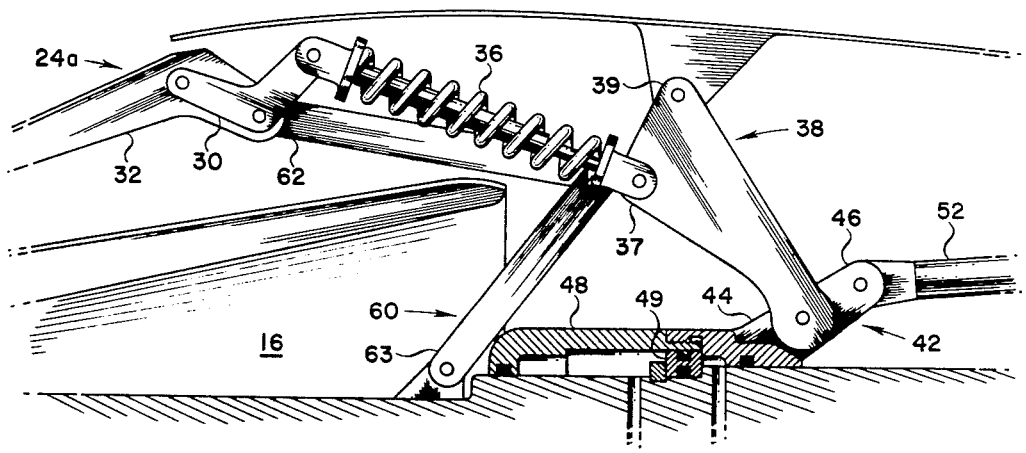
FIGURE 8 is a view similar to FIGURE 6 with the parts thereof shown in the position they assume when the device is in its FIGURE 3 position.

As the primary cone 22 moves aft, the cylinder 48 moves forward from its FIGURE 6 position to its FIGURE 7 position and bell crank 30 acts through spring cartridge 36, triangular member 38 and link 42 to swing the leading edge 25 of each segment 24 downwardly into engagement with the decreasing diameter of cone 22. Then, as cone 22 moves further aft to its FIGURE 5 position, the cylinder 48 moves forward to its FIGURE 8 position so that bell crank 30 will not only continue decreasing the diameter of edge 25, but will also increase the diameter of the aft edges of segments 24a. Simultaneously, triangular member 38 and rollers 54 increase the diameter of bleed scope 17 so that the air passage 64 is formed with the aft edge of the secondary cone 24 (FIGURES 5 and 8). Bleed air enters passage 64 and flows along the inner surface of wall 18 to a point of disposal (not shown).

At supersonic speeds, the outer surfaces of the tip 20, primary cone 22 and secondary cone 24 constitute a compression surface or ramp co-operating with the lip 14 of cowl 12 to gradually decelerate the flow of air through the system by producing the weak, oblique shock waves represented by the lines 66 in FIGURE 3.

It is well known that at supersonic speeds not exceeding Mach 2.2, it is only necessary to change the flow path of air to an engine by about 25 degrees. This may be done relatively abruptly. Therefore, the aforementioned compression surface may have an abrupt transition from the slope at the cone 22 to a maximum of about 25 degrees. Such an abrupt transition may be obtained by employing but a single secondary cone 24. When, on the other hand, it is necessary to deal with speeds in the neighborhood of Mach 3, the flow path of the air must be gradually changed by about 40 degrees. Such a gradual change is obtained by using a plurality of secondary cones (not shown) to present a compression surface with a more gentle transition from the primary cone. In the Mach 3 flight speed region it may be necessary to employ an inner cowl lip angle greater than 5 degrees, i.e., on the order of 15 degrees, to prevent lip shock detachment. The cowl will still have low drag because the lip can be turned back to a very low angle in a very short distance. Of course, it is apparent to those skilled in the art that the teachings of this invention may be applied to aircraft diffusers known as the "two" dimensional type."

While the particular supersonic diffuser herein shown and described in detail is fully capable of attaching the objects and providing the advantages hereinbefore stated, it is to be understood that it is merely illustrative of the presently preferred embodiment of the invention and that no limitations are intended to details of construction or design herein shown other than as defined in the appended claims.

We claim:

1. A supersonic diffuser for an aircraft comprising:
   (a) a cowl having a lip;
   (b) compression surface means having a downstream end mounted downstream of said lip for turning the flow of air to said cowl in such a manner that supersonic diffusion takes place upstream of said lip;
   (c) bleed scoop means connected to the downstream end of said surface means for bleeding off the boundary layer of air flowing along said surface means during supersonic operation of said aircraft;
   (d) means to extend said compression surface upstream; and
   (e) linkage means to close said bleed scoop means when said compression surface means is extended upstream.

2. A supersonic diffuser followed by a subsonic diffuser for aircraft comprising:
   (a) a cowl having a lip forming a low cowl angle to minimize aerodynamic drag on said cowl;
   (b) compression surface means having a downstream end mounted downstream of said lip for turning the flow of air to said cowl in such a manner that supersonic diffusion takes place upstream of said lip, whereby maximum flow stability is obtained;
   (c) bleed scoop means connected to the downstream end of said surface means for bleeding off the boundary layer of air flowing along said surface means during supersonic operation of said aircraft, the bleed scoop means extending into the air flowing along the compression surface means to thereby serve to collect the boundary layer flowing along this surface;
(d) means to extend said compresion surface upstream; and
(e) linkage means to close said bleed scoop means when said compression surface means is extended upstream.

3. The diffuser of claim 2 wherein said cowl angle is within a range of approximately 0–5 degrees.

4. A supersonic diffuser for aircraft comprising:
(a) a cowl having a lip forming a low cowl angle to minimize aerodynamic drag;
(b) variable geometry cone means mounted in said cowl, said cone means having compression surface means upstream of said lip for turning the flow of air to said cowl in such a manner that supersonic diffusion takes place upstream of said lip, said cone including a bleed scoop forming a passageway with said surface at said lip for bleeding off the boundary layer of air flowing along said surface means at supersonic speeds;
(c) linkage means connected to said cone for varying the geometry of said compression surface;
(d) means to extend said compression surface upstream; and
(e) linkage means to close said bleed scoop means when compression surface means is extended upstream.

5. The diffuser of claim 4 wherein said cone means includes a primary cone and a secondary cone.

6. The diffuser of claim 4 wherein said compression surface means has a downstream end positioned downstream of said lip.

7. The diffuser of claim 4 wherein said linkage means connected to said cone changes the geometry of said cone so that the compression surface becomes concave in cross section.

8. A supersonic diffuser comprising;
(a) a cowl having an upstream lip;
(b) a compression surface means extending upstream of said cowl comprised of three segments, an upstream low-angle diffuser adjacent to a variable angle compression surface next downstream and a subsonic compression surface downstream from the variable surface;
(c) means to move said upstream compression surface toward said cowl;
(d) linkage means to cause said variable compression surface to increase its angle with respect to said upstream compression surface responsive to the movement of said upstream compression surface toward said cowl; and
(e) linkage means to provide a bleed scoop between said variable compression surface and said subsonic compression surface when said upstream compression surface is in close proximity to said cowl.

9. A diffuser of claim 8 wherein said cowl has an internal angle of approximately 0 to 5 degrees.

References Cited by the Examiner
UNITED STATES PATENTS

| | | | |
|---|---|---|---|
| 2,638,738 | 5/53 | Salter | 60—35.6 |
| 2,934,893 | 5/60 | Streeter | 60—35.6 |
| 3,077,735 | 2/63 | Johnson et al. | 60—35.6 |
| 3,104,522 | 9/63 | Pennington et al. | 244—53.8 X |

FERGUS S. MIDDLETON, *Primary Examiner.*

ANDREW H. FARRELL, MILTON BUCHLER,
*Examiners.*